United States Patent Office 3,809,546
Patented May 7, 1974

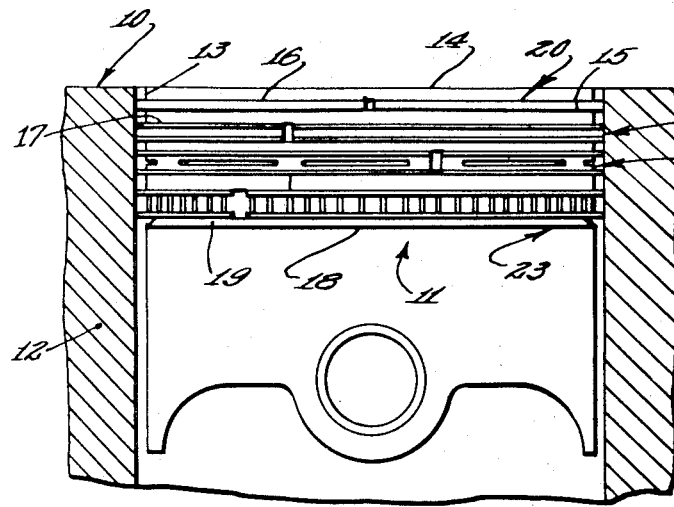

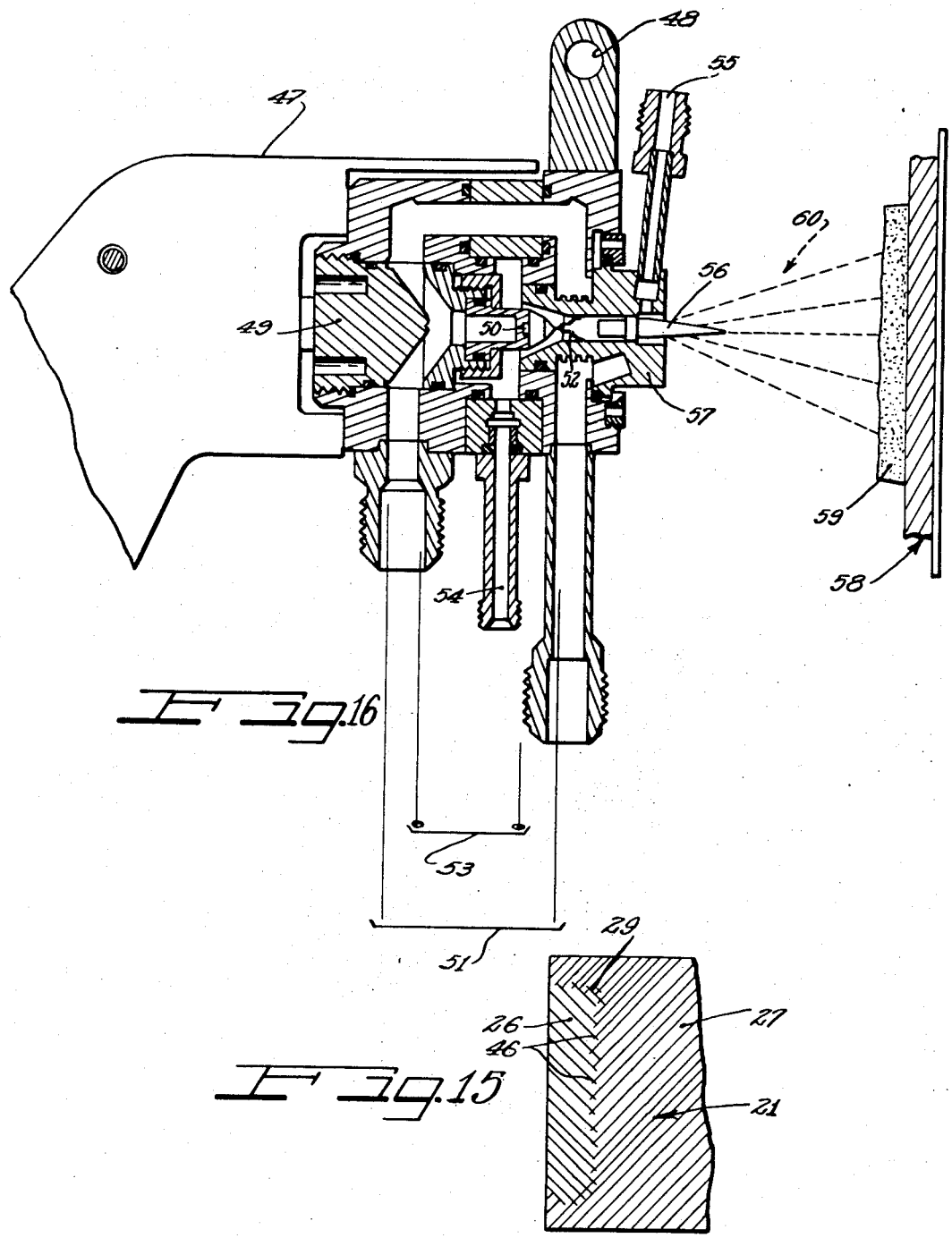

3,809,546
METHOD OF MAKING A HARD ALLOY MATRIX CONTAINING A TUNGSTEN-BORON PHASE
Herbert F. Prasse, Town and Country, and Harold E. McCormick, Ballwin, Mo., assignors to Ramsey Corporation, St. Louis, Mo.
Original application Jan. 7, 1970, Ser. No. 1,187, now Patent No. 3,725,017. Divided and this application Aug. 15, 1972, Ser. No. 280,849
Int. Cl. C23c 7/00
U.S. Cl. 75—.5 BC 12 Claims

ABSTRACT OF THE DISCLOSURE

This invention relates to a method of making an novel alloy containing a tungsten-boron phase. The alloy comprises a matrix such as a nickel-chromium, or other nickel containing matrix, having therein a separate tungsten-boron phase. The alloy is used as a facing or coating for a number of base materials, and in particular as a piston ring facing for the bearing portion thereof. The invention is particularly directed to a method of making said alloy by utilizing a plasma jet spray technique.

BACKGROUND OF THE INVENTION

Field of the invention

This is a division of our pending application Ser. No. 1,187, filed Jan. 7, 1970, now U.S. Pat. No. 3,725,017.

The invention is concerned with a hard facing tungsten alloy useful as a facing or coating for a wide variety of substrate materials, including iron and steel based materials. The alloy is particularly useful as a facing for piston rings, including compression and oil control rings for internal combustion engine pistons.

Description of the prior art

Piston rings, including compression rings and oil control rings are normally coated with a hard facing metal. A typical example is a flame spray applied molybdenum hard facing material which affords excellent performance for piston rings in high-compression, high temperature operating internal combustion engines. Another coating or facing for piston rings is one composed of a refractory metal carbide such as tungsten carbide. In the situation where tungsten forms the bulk of the alloy coating, to date it has been thought that the tungsten must be in the form of a compound such as tungsten carbide. Efforts to make a piston facing containing tungsten itself as a separate phase have been unsuccessful, since the tungsten has been found to be too soft, and does not protect the piston ring under typical operating conditions to the sought-after degree of performance.

It would therefore be a substantial advance in the art if an alloy were discovered which contained a substantial amount of tungsten per se as a separate phase and yet was sufficiently hard to be used as a coating for piston rings in high-compression internal combustion engines.

SUMMARY OF THE INVENTION

The present invention provides a plasma jet spray method for making a metal alloy useful as a hard facing material. The alloy comprises an alloy matrix containing a tungsten-boron phase in which the boron is interstitially disposed. The hardened tungsten-boron phase is contained in an alloy matrix which is preferably a nickel-containing matrix such as a nickel-chromium or nickel-aluminum matrix.

The resulting tungsten-boron alloy matrix is particularly useful as a coating for piston rings when applied, preferably by a plasma jet spraying technique. Broadly speaking, the hard tungsten-boron alloy matrix is prepared by converting tungsten-carbide to tungsten with boron to harden the tungsten phase.

A conventional plasma jet spraying operation includes the steps of providing a plasma flame spray gun containing a spray chamber to which is conveyed the plasma gas. An electric arc is applied in the chamber to ionize the gas. To the chamber there is attached a jet nozzle into which is introduced a spray metal powder preferably suspended in a carrier gas. The metal powder is then melted and thrust upon a base material as a workpiece whereby said base material is coated. The coating on the base material is built by moving the gun relative to the workpiece or by moving the workpiece relative to the gun or both to successively deposit a plurality of thin layers of metal.

The improvement of the above method which comprises the gist of the process of the invention here includes the steps of providing a powder of tungsten carbide, boron and at least one additional alloying element. Hydrogen is utilized in combination with nitrogen or argon as a plasma gas. The hydrogen should be flowed at a rate of 20–30 standard cubic feet per hour. Another important variable which must be controlled is the distance of the gun from the workpiece. This may be varied from 3.5 inches to 6.5 inches. Under such conditions the base material is coated with a hard facing comprising the just-described alloy containing a hardened tungsten-boron phase.

It is an object of this invention to provide a method of making the above described tungsten-boron alloy matrix for use as a hard facing by resort to a plasma jet coating technique, wherein certain variables of this process are specifically adjusted to achieve the desired hard tungsten-boron alloy.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 9 is a side elevational view, with parts in cross section, of an engine piston ring cylinder assembly, wherein the piston has ring grooves equipped with compression and oil control rings, each having a bearing face engaging the cylinder which is composed of an in situ formed plasma jet applied tungsten-boron alloy matrix, according to this invention.

FIG. 10 is an enlarged fragmentary cross-sectional view of the top compression ring in the piston of FIG. 9.

FIG. 11 is a view similar to FIG. 10, but illustrating the second compression ring in the piston of FIG. 9.

FIG. 12 is a view similar to FIG. 10, but illustrating the oil control ring in the third ring groove of the piston of FIG. 9.

FIG. 13 is a view similar to FIG. 10, but illustrating the oil control ring in the fourth ring groove of the piston of FIG. 9.

FIG. 14 is a diagrammatic cross-sectional view of a plasma flame spray gun typically used to coat a base material according to the method of the invention.

FIG. 15 is an enlarged fragmentary cross-sectional view taken through an interface between an alloy matrix filling a groove and the base body.

FIG. 16 is a cross-sectional view of a plasma jet spray gun for applying the hard-faced surface to a piston ring or other workpiece.

DESCRIPTION OF THE PREFERRED EMBODIMENTS

Figure 1:
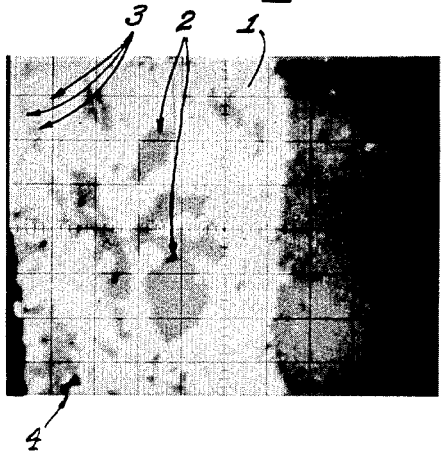
FIG. 1 is a photomicrograph of a specimen typifying a tungsten alloy of the invention.
Figure 2:
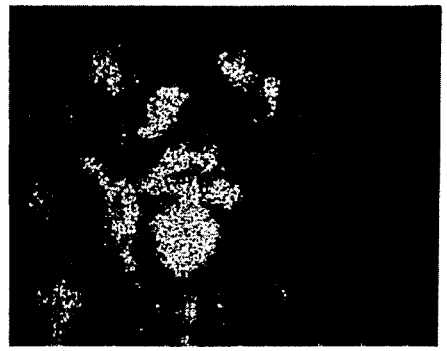
FIGS. 2–8 are X-ray fluorescence photomicrographs of various components contained in a typical alloy here.
Figure 3:
Figure 4:
Figure 5:
Figure 6:
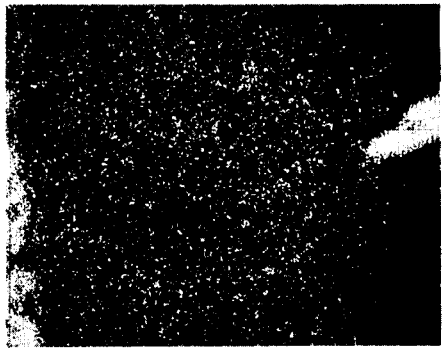
Figure 7:
Figure 8:

As noted above, we have discovered a novel tungsten-boron alloy matrix which is particularly useful as a hard facing for piston rings. The alloy matrix contains a separate interstitially boron-hardened tungsten phase and is believed to be the first alloy matrix known which contained a tungsten-boron phase substantially free from carbon or tungsten carbide which has sufficient hardness that a hard facing could be prepared therefrom. For example, tungsten-boron phase has a Vickers hardness 40 DPN (diamond penetration number with a 40-gram load) of greater than about 2000, and will generally range between 2500 and 3500 Vickers, and more often will fall within the range of 2700–3200 Vickers.

The alloys of our invention contain a relatively high amount of tungsten as a separate phase. Generally, the amount of tungsten is at least 35% by volume of the alloy specimen, and more often ranges from about 35% to about 60% by volume.

In a greatly preferred embodiment the matrix containing the tungsten-boron phase is a nickel-chromium matrix. In such situation there is usually present free nickel. When free nickel is present it is usually available in an amount less than about 6.0%.

The hardness of the nickel-chromium matrix phase is usually at least 800 Vickers (40 DPN), more often 850–1600 Vickers, and most typically 900–1200. The free nickel phase normally thought to be relatively soft has a hardness of at least 400 Vickers (40 DPN). The free nickel hardness will normally range from about 400 Vickers to about 900 Vickers. In a typical situation the free nickel hardness is 500 Vickers.

Boron, of course, is an integral part of the tungsten metal alloys of the invention, and is usually present in an amount ranging from about 1% to about 7% by weight of the facing or coating alloy matrix, more often 1.5–5% by weight. In addition to hardening the tungsten phase the boron also hardens the free nickel phase. The interstitial hardening by boron takes place by a distending of the lattice structure of tungsten and nickel. That is, boron is substituted in the lattice parameter of tungsten whereby the tungsten phase is sufficiently hardened to be useful as a hard facing or coating.

As will be described in more detail hereinafter, it is greatly preferred that the alloy matrix invention be derived by plasma jet spraying a powder mixture or alloy comprising at least tungsten carbide and boron and at least one additional alloying element. One typical tungsten carbide powder which can be sprayed has the following components, percentages being by weight:

| | Percent |
|---|---|
| Tungsten carbide | 25 to 55 |
| Cobalt | 4 to 8 |
| Nickel | 25 to 45 |
| Chromium | 3 to 7 |
| Aluminum | 0.5 to 7 |
| Boron | 1 to 7 |

Balance—substantially iron.

A specific alloy contains ingredients having the following percentages by weight:

| | Percent |
|---|---|
| Tungsten carbide | 40 |
| Cobalt | 6 |
| Nickel | 38.8 |
| Chromium | 6 |
| Boron | 1 |
| Aluminum | 0.7 |

Balance—iron with small amounts of silicon and carbon.

In addition to tungsten, nickel, chromium, aluminum, boron, cobalt and silicon, mentioned above, the alloys of the invention may also include a number of additional metals and metalloids such as titanium, tantalum, columbium, vanadium, zirconium, hafnium, etc.

The above-described alloys may be used to form coatings on a wide variety of conventional surfaces, as for example, on iron and steel alloys for any purpose which requires a wear and/or load-resistant surface. Thus, for example, the coatings derived from the alloys described here are extremely useful as bearing surfaces as for example, crankshafts subject to high loading forces. The coatings in accordance with the invention may also be used for forming polished rod liners, pump plungers, medium-to-high temperature-resistant steel roller bearings, furnace rolls, engine valve trim, glass molds, engine piston tops and annealing rolls or the like.

As mentioned above, the alloys are particularly useful in coating the bearing faces of piston rings. It is greatly preferred that the piston rings be coated in situ with the alloys described here by means of a plasma jet spray technique as described below.

Generally, when used to coat or face piston rings, the coating ranges in depth from about .002 to about .008 inch, and in some cases the coating depth is as high as 0.012 inch. A greatly preferred method of coating base articles involves resort to a spraying technique preferably effected with a plasma flame spray gun, as for example of a type which produces a plasma flame by constricting an electric arc in a nozzle with a plasma-forming gas, for example nitrogen or argon alone as a primary gas, or in mixture with hydrogen as a secondary gas. Guns which produce a plasma flame in this manner are, for example, described in U.S. Pat. 2,960,594. In this technique a powder is sprayed which ultimately forms the coating alloy. The term "powder" as used herein is generically intended to designate not only powder in a loose form but powder in a bonded form. Of course, in the latter situation the spray gun must utilize a flame of sufficient temperature to melt the metal. A plasma flame is extremely useful in this situation.

In more detail, the method of coating articles utilizing a plasma jet spraying technique includes the steps of conveying to a spray chamber of a plasma flame spray gun a source of a plasma gas. An electric arc is applied in said chamber to ionize said gas and a spray metal powder preferably suspended in a carrier gas is introduced into a jet nozzle which is connected to the chamber. The metal powder is then melted and thrust upon a base material operating as a workpiece whereby said base material is coated. The coating is specifically built up by moving the gun relative to the workpiece and workpiece relative to the gun to deposit a plurality of thin layers of metal.

It has been discovered that the above method broadly described should be carried out in a specific manner in order to deposit a tungsten phase in the coating by means of utilizing a tungsten carbide powder or alloy as a spray metal source.

The plasma flame must be an oxidizing flame at approximately 2″ from the nozzle of the plasma gun and, preferably, contains approximately 80% air by aspiration. The high air content and high temperature of the plasma flame is required to oxidize the tungsten-carbide particles to tungsten according to the following reaction:

$$3WC + 2O_2 \rightarrow 2CO_2 + W + W_2C$$

The $W_2C$ may be present in very small amounts. The particle velocity at the specified gas flows and gun-to-work-distance is also very high, being in the order of 400 feet/second. The high velocity of the molten alloy gives very high quench rates when the molten alloy strikes the cooler surface to be coated. Quench rates in the order of 10⁵ degrees F. per second have been estimated. The high quench rates (splat cooling) harden the normally softer nickel-aluminum or nickel-chromium alloy matrix in the final coating.

If the following directions are not carried out as indicated, there is a greater probability that a tungsten carbide phase will be formed rather than a pure tungsten metal phase.

The improvement over a conventional plasma jet spraying technique involves first providing as a powder (as powder has been broadly defined) tungsten carbide and boron and at least one additional alloying element, such such as any one or more of cobalt, nickel, chromium, aluminum, etc. Hydrogen, as a secondary gas, is utilized in combination with nitrogen or argon as a primary gas to comprise a plasma gas. It is important that the hydrogen gas flow be carried out at a rather specific rate, namely, at a flow rate of 20–30 standard cubic feet per hour, and more often 23–27 standard cubic feet per hour. In addition, it has been found that the distance of the gun from the workpiece is important in order to achieve the desired tungsten phase. Specifically, the distance may vary from about 3.5 inches to about 6.5 inches. In an average run the distance of the gun from the workpiece will be about 4 or 6 inches. Under such conditions the base material is coated with a hard facing of tungsten, and more specifically an interstitally boron-hardened tungsten phase.

A number of other process variables have been found to be important to best achieve the desired alloy coating, and particularly to deposit the desired tungsten phase in the alloy. For example, thet rate of vertical traverse, governing the speed of the gas that moves across the workpiece is important. It is most desirable to match the temperature of the spray material and that of the substrate, and this is best done by properly moving the gun relative to the workpiece. This rate for best results generally ranges from about 28 inches to about 32 inches per minute.

The angle of the gun relative to the workpiece is a still further important process variation. Here, this angle should normally range from about 35° to about 55° if compression rings are being sprayed. In case of oil rings the gun angle is 0°, that is, the coating is sprayed straight on.

Other preferred expedients in carrying out the plasma technique include utilizing a D.C. amperage in applying said arc which ranges from about 475 amps to about 550 amps. A typical powder feed rate ranges from about 10 to about 12 pounds per hour. Lastly, the flow of nitrogen or argon primary gas should range from about 80 standard cubic feet per hour to about 95 standard cubic feet per hour, and more often is 85–90 standard cubic feet per hour. Generally, the powder is conveyed to the jet by means of a carrier gas such as nitrogen. Carrier gas flow may be 45–60 standard cubic feet per hour and more often is 50–55 standard cubic feet per hour.

The thickness of the layer deposited is a matter of choice and will be dependent, of course, upon the number of passes of the gun over the base material being coated. In a typical situation involving coating of a piston ring there will be four passes involved. Generally, each pass will build up a layer having a coating thickness of 0.002 inch.

It is interesting to note here that when the plasma jet spray process is varied outside limits discussed above, in many instances a tungsten carbide alloy will be produced which does not contain a free tungsten phase. The directions noted above must be closely followed to provide the desired alloy containing tungsten itself as a separate phase.

In order to illustrate more fully the alloys of the invention and their mode of preparation the reader's attention is now drawn to the figures which will be described in more detail below.

FIG. 1 is a photomicrograph showing the various phase identifications made using an electron microprobe employing the specimen current images. Specifically shown is a coating containing a free tungsten metal phase 1, a nickel-chromium matrix phase 2, free nickel metal 3, and aluminum oxide 4 as major constitutents. The sample was prepared by coating a piston ring according to the plasma jet spray technique outlined above. A transverse section of the coated piston ring was then used in the electron microprobe work. The samples prepared for the microprobe were rough and were ttherefore finish polished, using only a diamond abrasive to avoid introduction of either aluminum or chromium into the coating. The magnification in the work was 1100X.

It was noted that the tungsten phase of FIG. 1 was found to be essentially carbon free as indicated by the X-ray fluorescence photomicrograph of the carbon distribution. While it has not been completely confirmed, it is believed that the tungsten carbide in the spray powder is oxidized during the spraying to provide a free tungsten metal phase. The occurrence of oxidation was further supported by the appearance of regions of free nickel metal associated with particulate aluminum oxide, which was produced by oxidation of the nickel aluminide fraction in the original spray powder. The distribution of boron, carbon and oxygen was uniform, excluding the aluminum oxide phases.

The presence of free tungsten metal was reconfirmed by X-ray diffraction experiments which found no evidence of a WC or $W_2C$ phase in the structure, although small amounts of these constituents would not be considered detrimental in the final coating.

FIG. 2–8 are photomicrographs of X-ray fluorescence displays of the characteristic radiation of various elements. Here, a coated piston ring was prepared by a plasma spray technique and longitudinal sections taken for use for X-ray diffraction studies. FIGS. 2–8 show X-ray fluorescence scans for the following elements respectively: chromium, nickel, tungsten, aluminum, carbon, oxygen and boron. Again the magnification was 1100X.

The piston ring sample analyzed above was designated as Sample A. Three other runs were made wherein piston rings were coated utilizing a plasma gas spray procedure, following parameters carefully outlined above in order to confirm the results obtained with Sample A. These samples were designated B, C and D. In each, no tungsten carbide was found either by microprobe examination or X-ray diffraction and free nickel and aluminum oxide were found in all samples.

Samples A–D were also analyzed to determine the volume fraction of the various phases present. These are given below in Table I. As is evident the free tungsten phase formed a substantial part of the alloy, and in most instances the majority of the alloy in terms of volume fraction.

TABLE I.—VOLUME FRACTION OF VARIOUS PHASES PRESENT

| Phase | Percent | | | |
|---|---|---|---|---|
| | A | B | C | D |
| Tungsten-boron | 57.0 | 44.0 | 50.0 | 54.6 |
| Nickel, chromium | 39.8 | 49.7 | 48.9 | 43.6 |
| (Ni-Cr) | (32) | (38) | (44) | (34) |
| (Ni) | (7) | (10) | (5) | (10) |
| Aluminum oxide | 1.6 | 6.2 | 1.1 | 1.8 |

Micro-hardness data were also obtained on Samples A–D. A Knoop Indentor was used with a 25-gram load and the resulting impressions were measured at a magnification of 500 diameters. As is apparent from the data below in Table II, the tungsten-boron phase was unexpectedly hard, positively evidencing interstitial hardening, since it is known that normally a tungsten phase per se is a comparatively soft material.

TABLE II.—MICROHARDNESS DATA

| Specimen | Knoop hardnes numbers (KHN) | |
|---|---|---|
| | Nickel-base | Tungsten-base |
| A | 950–1820 | 2700–3900 |
| B | 300–1400 | 2300–2500 |
| C | 500–1000 | 1600 |
| D | 850–950 | 2600–2800 |

While there is no direct conversion of Knoop readings to Vickers readings above about 1000, a Knoop reading of about 1800 corresponds to a Vickers reading of about 3000, showing the tungsten phase in each instance above is at least 2500 Vickers hardness.

FIGS. 9–14 depict a base material coated with the hard facing tungsten metal alloy described above.

More specifically, the piston and cylinder assembly 10 of FIG. 9 illustrates generally a conventional 4-ring groove internal combustion engine piston, operating in an engine cylinder. The assembly 10 includes a piston 11 and an engine cylinder 12 with a bore 13, receiving the piston 11. The piston 11 has a head 14 with a ring band 15 having four peripheral ring grooves 16, 17, 18 and 19 therearound. The top ring groove 16 has a split solid cast iron compression or fire piston ring 20 therein. The second ring groove 17 has a split solid second compression ring 21 somewhat wider than the ring 20. The third ring groove 18 carries a two-piece oil control ring assembly 22. The fourth or bottom ring groove 19 carries a three-piece oil control ring assembly 23.

As shown in FIG. 10, the top compression or fire ring 20 has a main body 24 composed of cast iron, preferably nodular gray iron, with a carbon content of about 3½% by weight. The outer periphery 25 of this ring is covered with a plasma jet applied alloy matrix coating 26 of the invention.

As shown in FIG. 11, the second compression ring 21 has a main body 27 composed of the same type of cast iron as the body 24 of the ring 20. The outer periphery 28 of the body 27 is inclined upwardly and inwardly from the bottom edge of the ring and a peripheral groove 29 is formed around this inclined periphery. The groove 29 is filled with the alloy matrix 26.

As shown in FIG. 12, the oil control ring assembly 22 in the third ring groove 18 is composed of a one-piece flexible channel ring 30 and a sheet-metal expander ring 31, having legs extending into the channel for expanding the ring 30. The ring 30 and the expander are more fully described in Mayhew et al. Pat. No. 3,281,156.

The one-piece oil control ring 30 has a pair of axially spaced, radially projecting beads 32. The peripheries of these beads 32 are coated with the coating 26.

In FIG. 13, the oil control ring assembly 23 includes a resilient spacer-expander ring 33 supporting and expanding a split thin rail ring 34. The assembly 33 is of the type disclosed in the Marien U.S. Pat. 2,817,564. The outer peripheries of the rail rings 34 are coated with the alloy matrix coating 26, according to this invention.

From the above description, it will be understood that the bearing faces of each of the compression and oil control rings 20, 21, 22 and 23 are coated with the alloy matrix coating 26 containing a free tungsten-boron phase according to this invention. The thus-coated bearing faces ride on and sealingly engage the wall of the bore 13 of the engine cylinder 12. The rings are compressed in the bore 13 so as to expand tightly against the bore wall and maintain a good sealing sliding engagement therewith.

As shown in FIG. 14, the alloy matrix forming the coatings or facings 26 is applied on the rings, as for example on the grooved rings 21, by stacking a plurality of the rings on an arbor 35 with the rings compressed so that their split ends will be nearly in abutment. The arbor clamping the stack of rings in their closed, contracted position, may be mounted in a lathe and the peripheries of the rings machined to form the grooves 29 therearound. The outer peripheries of the rings 21 on the arbor are then coated with the alloy matrix 26 from a plasma jet spray gun 36. The gun 36 includes an insulated casing such as Nylon 37, from which projects a rear electrode 37, the projection of which is adjustably controlled by a screw knob 39. The front face of the casing receives a front electrode 40. The casing 37 and electrode 40 are hollow and water-jacketed so that coolant may circulate therethrough from an inlet 41 to an outlet 42. Plasma jet gas is fed through an inlet 43 into the chamber provided by the casing 37 and the electrode 40 to flow around the electrode 38.

The front end of the electrode 40 provides a nozzle outlet 44 for the plasma flame and the ingredients to form the alloy of the coating 26 are fed to this nozzle through a powder inlet 45, just in advance of the discharge outlet of the nozzle.

A plasma composed of ionized gas is produced by passing the plasma gas from the inlet 43 through an electric arc established between the electrodes 38 and 40. This plasma gas is non-oxidizing and is composed of nitrogen or argon in combination with hydrogen. The plasma flame exuding from the nozzle 44 draws the alloy-forming powder therewith by aspiration and subjects the powder ingredients to such high temperatures as to cause them to alloy. The spray powder is usually suspended in a carrier gas. The jet stream carries the alloy into the bottom of the groove 29 of each piston ring to fill the groove.

The preferred powder fed to the powder inlet 45 of the gun 36 is composed of tungsten carbide, cobalt, nickel, chromium, boron and aluminum, in the proportions indicated hereinabove.

The preferred deposited coating 26 is an alloy matrix containing a separate tungsten-boron phase bound in a fused and alloyed matrix of nickel and chromium. Free nickel may be present and boron acts to interstitially harden the free tungsten. The alloy 26 as illustrated in FIG. 15 is actually formed in situ in the groove 29, and is bonded to the base body 27 of the ring along a diffused interface or welded zone 46. This interface, of zone 46, is composed of the materials of the alloy 26 and the material of the ring body 27.

During the jet spray application, it is desired to maintain a temperature in the groove 29 such that will prevent excessive melting and burning away of the body metal 27 and also to act as a rapid quench to harden the nickel aluminum alloy matrix. For this end result, the arbor of rings is preferably cooled with an external blast of inert gas impinging on both sides of the jet flame. It is desired to keep temperatures of the rings 21 in the arbor around 400° F. or less. It is not necessary to provide any subsequent heat treatment for the plasma jet coated rings other than allowing the rings to air cool.

The powder fed to the inlet 45 is metered preferably with the aid of an aspiring gas, vibration, mechanical gearing, etc. All of the powder is completely melted and penetrates into the center cone of the plasma jet flame.

The provision of the alloy coatings 26 in a groove to form a band around the periphery of the piston ring 21, for example, utilizes the body metal of the ring as a land alongside of the groove to form an initial quick break-in surface for the ring, as described in the Marien Pat. 3,133,739. The inclined periphery of the ring 21 may be formed by grinding or by torsional twisting of the ring in use in the ring groove, as described in the Marien patent.

The operation of plasma gas jet spraying is perhaps better illustrated by reference to FIG. 16 showing a spray gun of this type and its mode of operation. Shown is spray gun 47 which may be fixed for mounting at 48. Also shown is electrode holder 49 and electrode 50. The gun is cooled by circulated cooling coming from coolant source 51. The arc 52 is created by power source 53. Plasma gas is fed in at location 54, the gas being a combination of nitrogen or argon with hydrogen to prevent excessive oxidation. The spray powder, suspended in carrier gas, enters at opening 55 and is fed into the area of plasma flame 56 in the nozzle 57. The plasma flame, of course, is created by ionization and combustion of the plasma gas. Also shown is a prepared base material for workpiece 58 upon which is coated a sprayed facing material 59 by means of spray stream 60. As previously noted, the gun is moved at a transverse angle back and forth over the base material to build up a plurality of layers constituting the entire final coating.

The following examples illustrate typical modes of carrying out the process of the invention in order to achieve the hard faced tungsten alloy containing tungsten itself as a separate alloy phase. It is understood, of course, that these examples are merely illustrative and that the invention is not to be limited thereto.

EXAMPLE I

A powder mixture was sprayed onto an arbor of both oil rings and compression rings by the plasma jet spraying techniques described above. The powder mixture contained ingredients having the following percentages by weight:

| | Percent |
|---|---|
| Tungsten carbide | 40 |
| Cobalt | 6 |
| Nickel | 38.8 |
| Chromium | 6 |
| Boron | 1 |
| Aluminum | 0.7 |

Balance—iron with small amounts of silicon and carbon.

The rings were coated with the hard-faced tungsten coating by resort to the following specific process parameters:

Gun-to-work distance: 6.0 to 6.5 inches
Gun angle—oil rings: 0° (straight on)
Compression Rings: 45°
Primary gas flow ($N_2$): 85–90 at 50 p.s.i. ref.
Carrier gas flow ($N_2$): 50–55 at 50 p.s.i.
Secondary gas flow ($H_2$): 23–27 at 50 p.s.i. ref.
D.C. current: 500–525 amps.
D.C. voltage: 80–86 volts ref.
Powder feed rate: 10.5#/hr.
Vertical feed rate: 28–32 in./min.
Arbor rotation speed: 60–90 r.p.m. (4" dia.)

The hard tungsten facing was then tested for hardness and had a Vickers hardness number with respect to the tungsten phase of an average of 2836 and a corresponding Knoop hardness of 1781.

This particular coating was also analyzed by means of electron probe analysis techniques described with respect to FIGS. 1–8. This analysis shows that the tungsten phase was essentially carbon-free and existed as a free phase contained in a hard nickel-chromium matrix phase. Free nickel metal and aluminum oxide were the other minor constituents.

EXAMPLE II

The powder of Example I was again plasma jet sprayed but via slightly different process conditions as set out below:

Process parameters

Gun-to-work distance: 3¾" to 4¼"
Gun angle—oil rings: 0°
Compression rings: 45°
Primary gas flow ($N_2$): 86–88 at 50 p.s.i.
Carrier gas flow ($N_2$): 52–55 at 50 p.s.i.
Secondary gas flow ($H_2$): 23–27 at 50 p.s.i.
D.C. current: 475–500 amps.
D.C. voltage: 90 ref.
Powder feed rate: 10.5#/hr.
Arbor rotation r.p.m.: 90–120 (4" dia.)

Again, the hard tungsten facing had a Vickers hardness number above 2500 with respect to the tungsten phase, and photomicrographs demonstrated the presence of a free tungsten metal phase. A hard nickel-chromium matrix phase was also present along with free nickel metal and aluminum oxide as other minor components of the alloy coating.

In addition to nickel-chromium and nickel-aluminum, other alloys may be used as a matrix material such as nickel-iron, nickel-copper-molybdenum and monel alloys.

We claim as our invention:

1. In a method of preparing an alloy matrix containing a tungsten-boron phase in which the boron is interstitially dispersed in the tungsten, the steps comprising introducing into a plasma flame jet a powder mixture comprising tungsten carbide, boron and at least one additional alloying ingredient, maintaining said plasma flame jet under oxidizing and temperature conditions such that said tungsten carbide is converted into free tungsten metal in a fused state and said free tungsten metal and said boron are capable of being formed upon cooling into a tungsten-boron phase in which said boron is interstitially dispersed in said tungsten, and cooling the resulting plasma flame jet-fused powder mixture to obtain said alloy matrix.

2. The method of claim 1, wherein cooling is effected by directing said fused mixture against a metal workpiece to cause said mixture to be deposited thereon and bonded thereto.

3. The method of claim 2, wherein said workpiece is a ferrous metal.

4. The method of claim 3, wherein said workpiece is a piston seal and the deposit formed thereon provides a hard facing bonded to the bearing face of said seal.

5. The method of claim 1, wherein said powder mixture is so proportioned as to its ingredients that the resulting alloy matrix contains from 1 to 7% of boron by weight of said alloy matrix.

6. The method of claim 5 wherein said powder mixture contains nickel as the one additional alloying ingredient.

7. The method of claim 1, wherein the powder mixture comprises ingredients having the following percentages by weight:

| | Percent |
|---|---|
| Tungsten carbide | 25–55 |
| Cobalt | 4–8 |
| Nickel | 25–45 |
| Chromium | 3–7 |
| Aluminum | 0.5–7 |
| Boron | 1–7 |

Balance—substantially iron.

8. The method of claim 7, wherein the powder mixture has the following percentages by weight:

| | Percent |
|---|---|
| Tungsten carbide | 40 |
| Cobalt | 6 |
| Nickel | 38.8 |
| Chromium | 6 |
| Boron | 1 |
| Aluminum | 0.7 |

Balance—iron with small amounts of silicon and carbon.

9. The method of claim 5, wherein the oxidizing conditions are maintained by aspirating an oxygen-containing gas into said jet.

10. The method of claim 1, wherein said powder mixture contains nickel and chromium as alloying ingredients.

11. The method of claim 1, wherein said tungsten-boron phase contains substantially no carbon or tungsten carbide.

12. In a method of coating articles utilizing a plasma jet spraying technique including the steps of providing a plasma flame spray gun containing a combustion spray chamber, conveying to said chamber a source of plasma gas, applying an electric arc in said chamber to ionize and ignite said gas, providing a spray metal powder, conveying said powder to a jet nozzle connected to said chamber whereby the metal powder is melted and thrust upon a base material operating as a workpiece, and whereby said base material is coated with said molten metal, building up said coating by moving said gun relative to said workpiece to successively deposit a plurality of thin layers of metal; the improvement which comprises providing as a powder tungsten carbide and boron with at least one additional alloying element, utilizing hydrogen in combination with nitrogen or argon as a plasma gas, said hydrogen having a flow rate of 20–30 standard cubic feet per hour, and operating said gun at a distance from said workpiece which varies from about 3.5 inches to about 6.5 inches, aspirating air into said plasma gas to maintain the same under oxidizing conditions to convert said tungsten carbide into free tungsten metal and the latter metal into a separate tungsten-boron phase, whereby said base material is coated with a hard facing comprising an alloy matrix containing a separate interstitially boron-hardened tungsten phase.

References Cited

UNITED STATES PATENTS

| | | | |
|---|---|---|---|
| 3,211,386 | 10/1965 | Frehn | 75—0.5 BC |
| 3,539,192 | 11/1970 | Prasse | 117—93.1 PF |
| 3,606,359 | 9/1971 | McCormick | 75—0.5 R |

WAYLAND W. STALLARD, Primary Examiner

U.S. Cl. X.R.

117—93.1, 105